United States Patent [19]

Snellman et al.

[11] Patent Number: 5,496,253
[45] Date of Patent: Mar. 5, 1996

[54] METHOD AND APPARATUS FOR FORMING BOOKBINDING STRIPS

[75] Inventors: Donald L. Snellman; Dean G. Tonkin, both of Seattle, Wash.

[73] Assignee: Norfin International, Inc., Seattle, Wash.

[21] Appl. No.: 237,642

[22] Filed: May 4, 1994

Related U.S. Application Data

[62] Division of Ser. No. 952,604, Sep. 28, 1992, Pat. No. 5,364,215.

[51] Int. Cl.$^6$ .................................................. B65H 45/22
[52] U.S. Cl. ........................ 493/320; 493/401; 493/403; 493/440; 493/455; 281/21.1
[58] Field of Search .................................. 493/320, 399, 493/401, 402, 403, 439, 440, 455; 281/21.1, 23, 28, 29, 36; 242/418.2; 226/119

[56] References Cited

U.S. PATENT DOCUMENTS

| | | |
|---|---|---|
| 951,436 | 3/1910 | Duryea et al. . |
| 998,283 | 7/1911 | Duryea et al. . |
| 1,844,516 | 2/1932 | Meyer et al. . |
| 2,153,846 | 4/1939 | Russell et al. . |
| 2,586,462 | 2/1952 | Forster . |
| 2,772,088 | 11/1956 | Nelson . |
| 2,819,657 | 1/1958 | Hammerstrom . |
| 2,899,737 | 8/1959 | Nilsson . |
| 3,006,633 | 10/1961 | Schoenberger, Jr. ............ 412/17 |
| 3,437,506 | 4/1969 | Falberg ............................ 117/44 |
| 4,053,845 | 10/1977 | Gould ............................... 330/43 |
| 4,089,514 | 5/1978 | Skipworth . |
| 4,161,436 | 7/1979 | Gould ........................ 204/157.1 R |
| 4,299,410 | 11/1981 | Jukola .............................. 281/21 R |
| 4,420,282 | 12/1983 | Axelrod ............................ 412/4 |
| 4,505,629 | 3/1985 | Lynch ............................... 412/5 |
| 4,547,000 | 10/1985 | Sallinen ........................... 281/23 |
| 4,565,477 | 1/1986 | Axelrod ............................ 412/5 |

(List continued on next page.)

FOREIGN PATENT DOCUMENTS

| | | |
|---|---|---|
| 0077795 | 1/1985 | European Pat. Off. . |
| 3152075 | 8/1985 | Germany . |
| 8709085 | 11/1987 | Germany . |
| 3811960 | 10/1989 | Germany . |
| 490869 | 3/1952 | Italy . |

OTHER PUBLICATIONS

"Open Sesame"–American Printer, Sep., 1991 pp. 46, 48–49.
"Bound to Stay Open"–American Printer, Mar., 1991, pp. 53–56.
"For Short Runs"–Otabind–Repkover™–Jun. 19, 1991.

*Primary Examiner*—S. Thomas Hughes
*Attorney, Agent, or Firm*—Dowrey & Associates

[57] ABSTRACT

Apparatus and method are disclosed for preparing a preprinted book cover for application to a book block in a perfect binding system A double-walled tubular attachment strip is adhesively attached to the cover spine portion of successive covers in a continuous process. Covers are fed onto a conveyor at a constant speed with a spacing between covers and adhesive is applied to the spine areas. Simultaneously a continuous double-walled attachment strip with a longitudinal lap joint in one wall is formed without adhesive from a source of paper web stock and pressed, lap joint down, onto the cover spines to form a continuous string of covers. The attachment strip is cut by laser cutting beam between each cover while the covers are moving. The double-walled attachment strip is formed by pulling the web under constant tension through side scoring wheels, holddown shoes, and forming devices which have surfaces to fold the edges of the moving web through 180° toward each other to form a lap joint. Prior to forming the double-walled strip, job information is printed on the web stock at a location which appears as the inside surface of the wall of the strip opposite the longitudinal lap joint. Laser cutting is accomplished by moving a focused cutting beam in a plane normal to the plane of the strip transversely to the direction of movement of the strip.

13 Claims, 12 Drawing Sheets

U.S. PATENT DOCUMENTS

| | | | |
|---|---|---|---|
| 4,656,905 | 4/1987 | Ginzburg et al. | 83/337 |
| 4,704,583 | 11/1987 | Gould | 330/43 |
| 4,791,846 | 12/1988 | Kirkpatrick | 83/659 |
| 4,856,692 | 8/1989 | Harper | 226/119 |
| 4,911,475 | 3/1990 | Lerman | 281/15.1 |
| 4,925,354 | 5/1990 | Cote | 412/8 |
| 5,078,424 | 1/1992 | Kadish | 281/21.1 |
| 5,127,786 | 7/1992 | Cross | 412/3 |

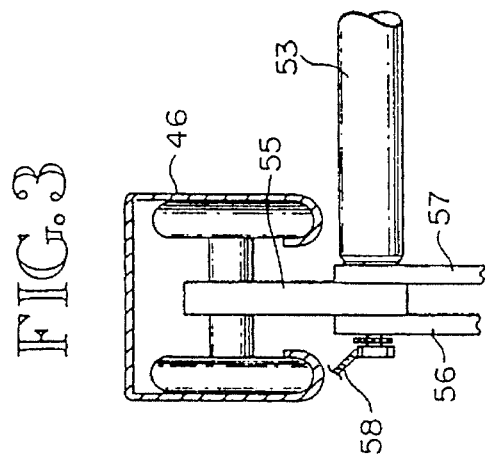
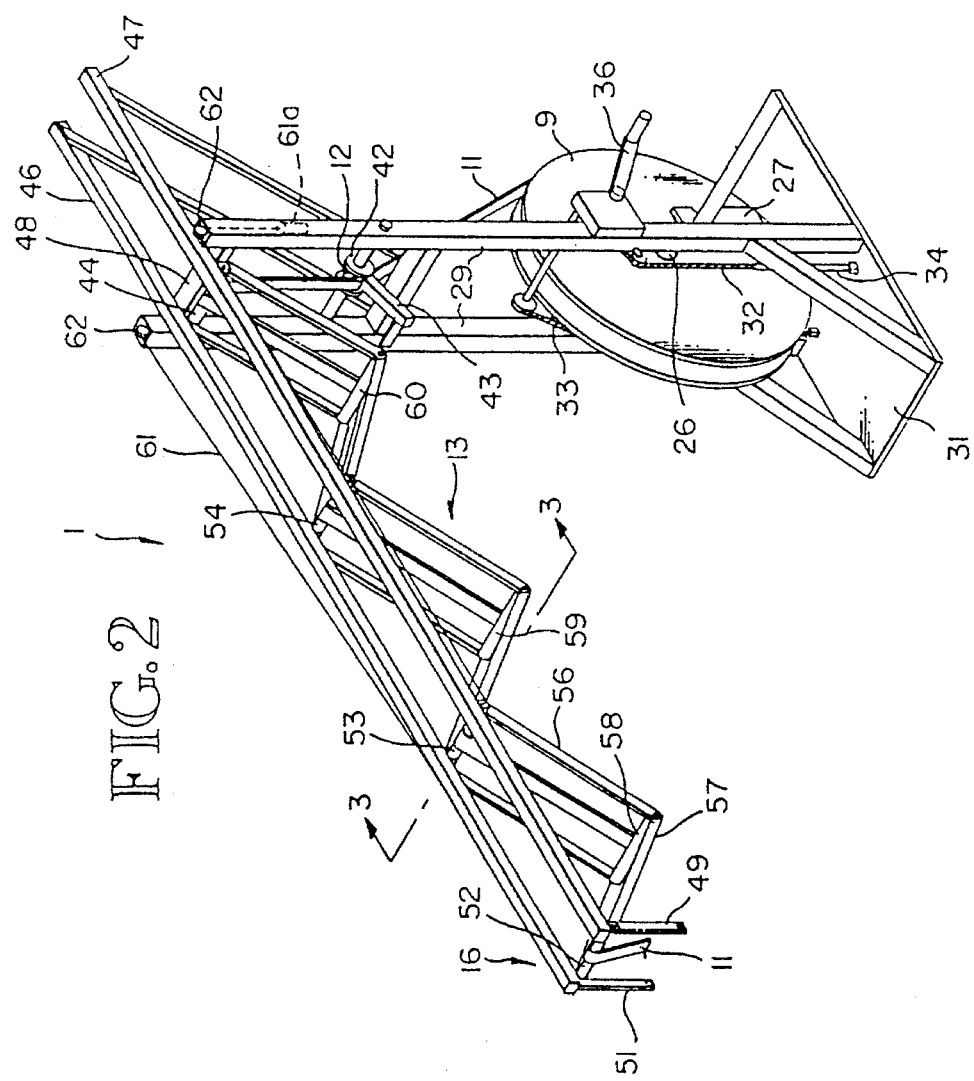

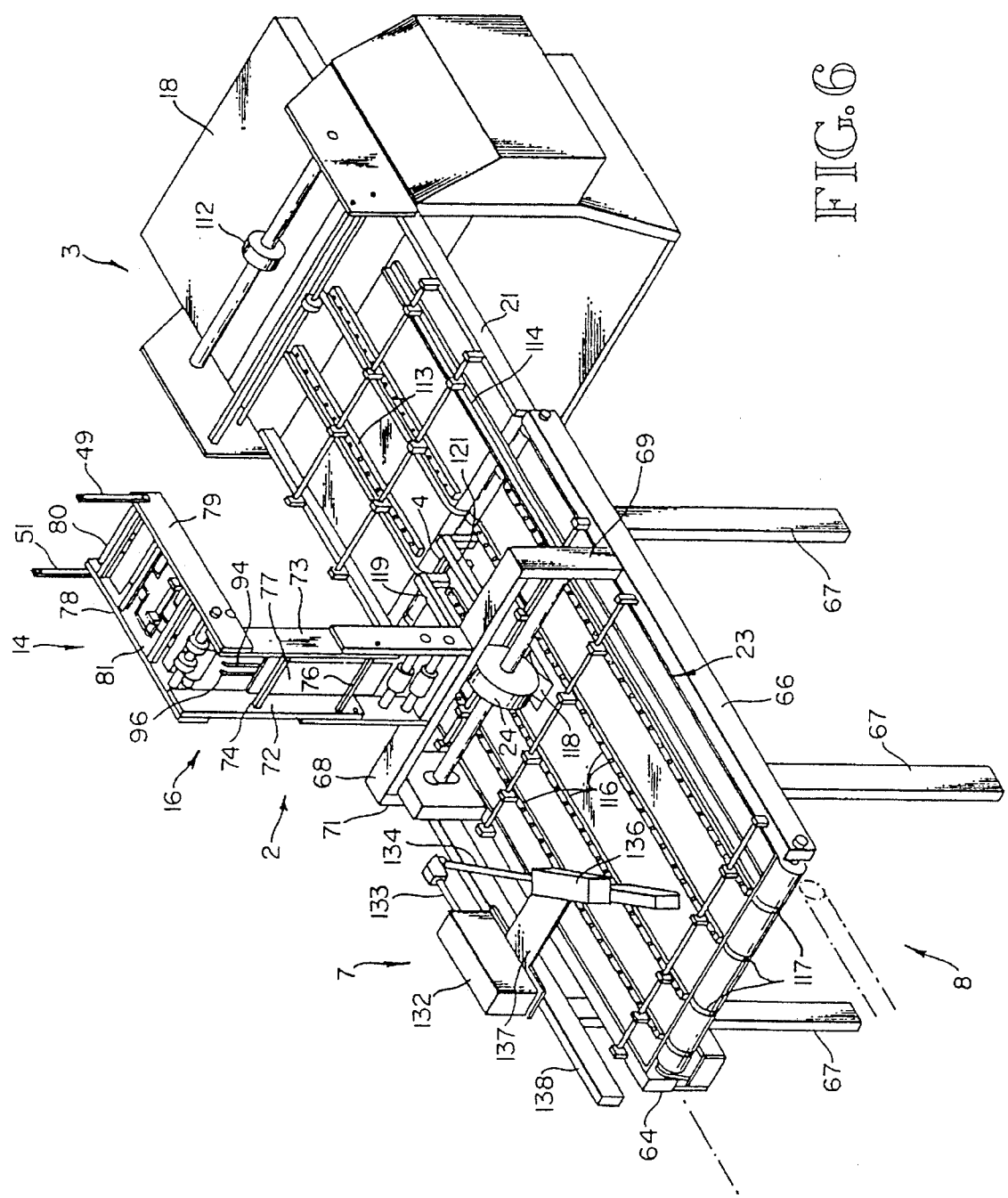

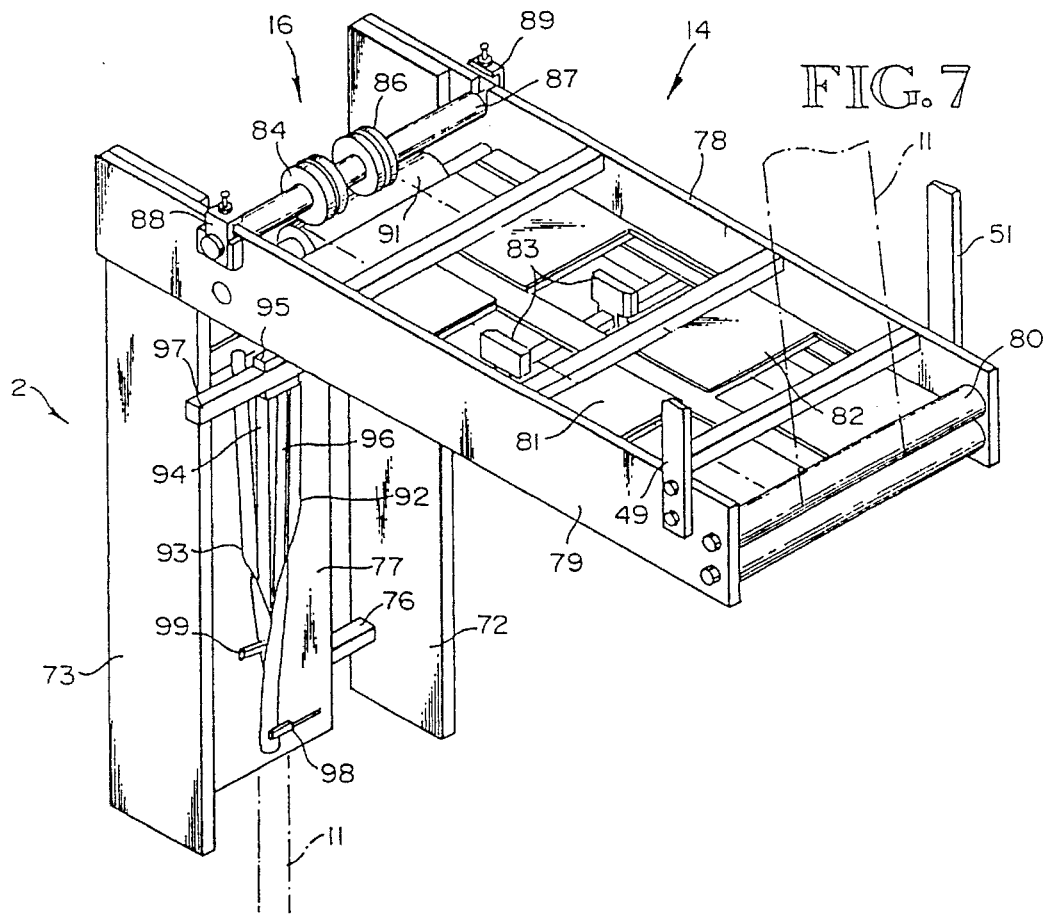
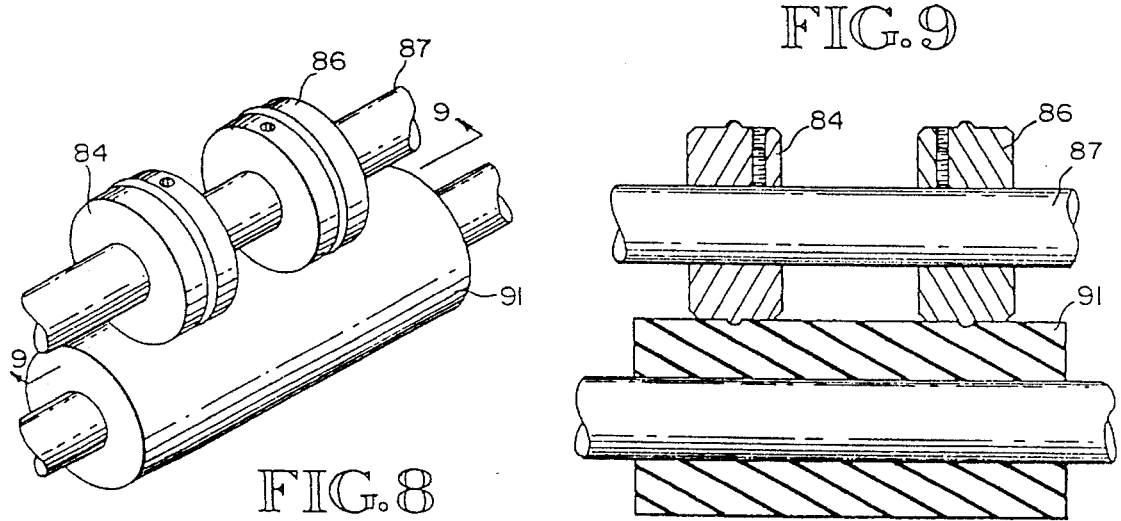

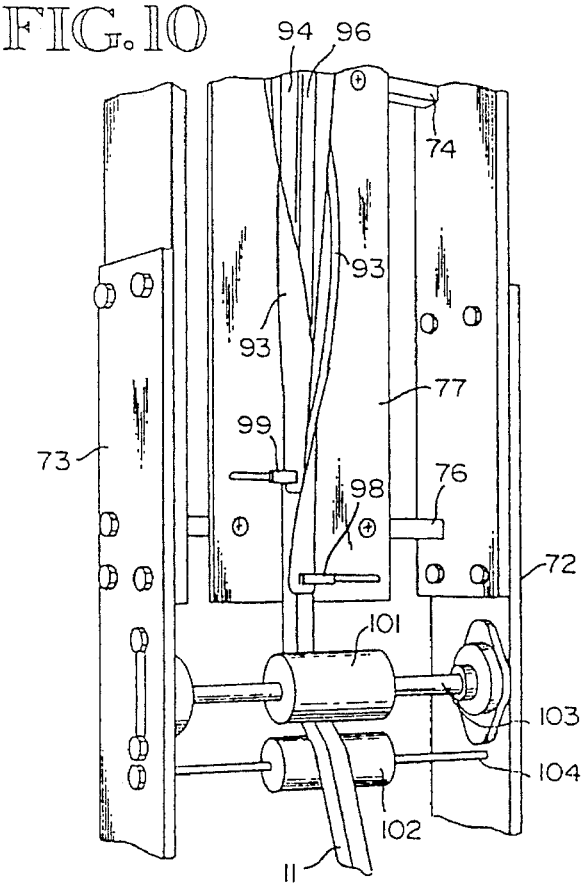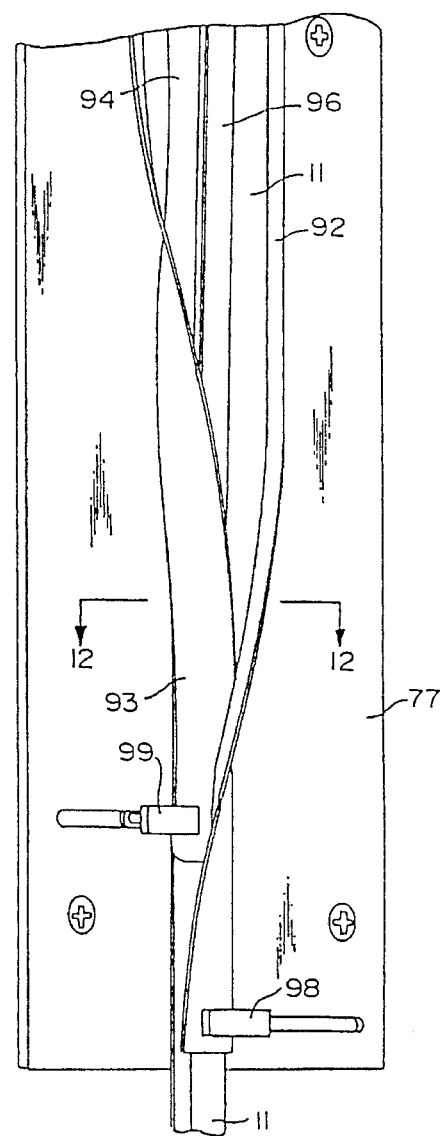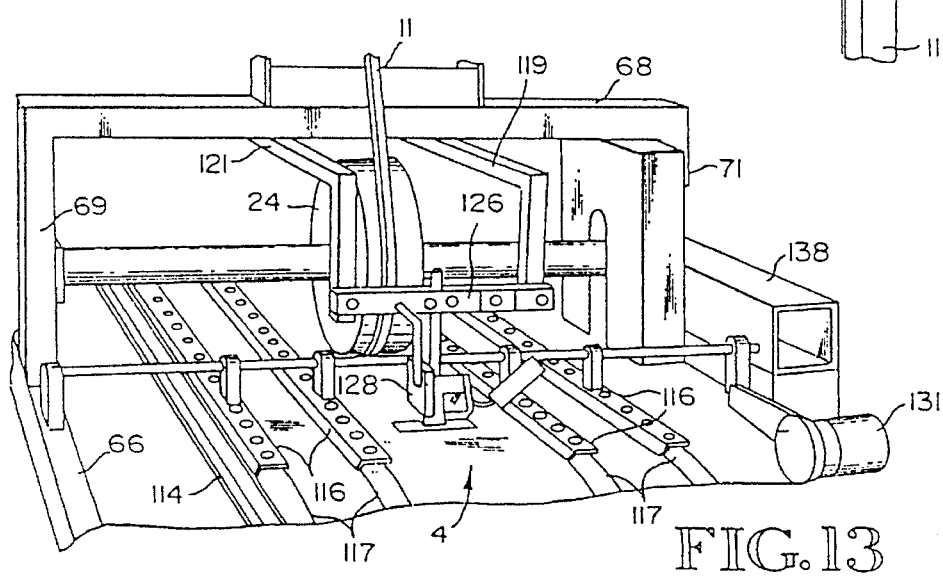

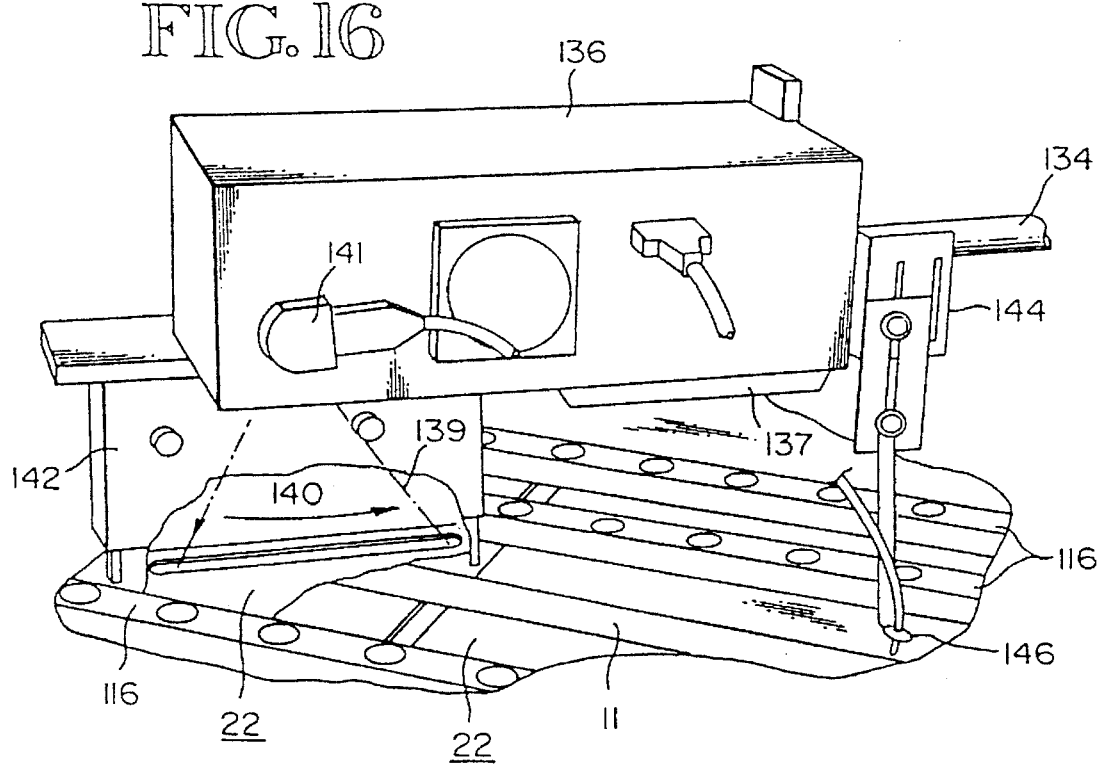
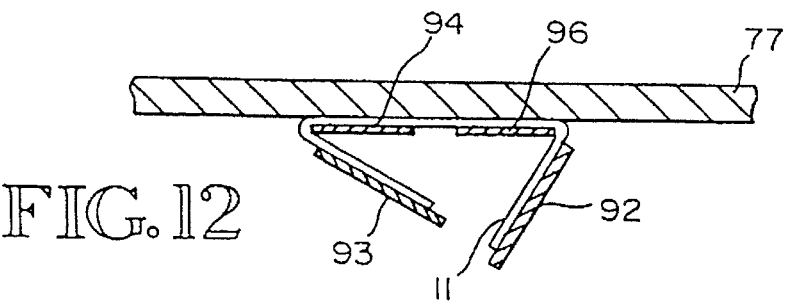

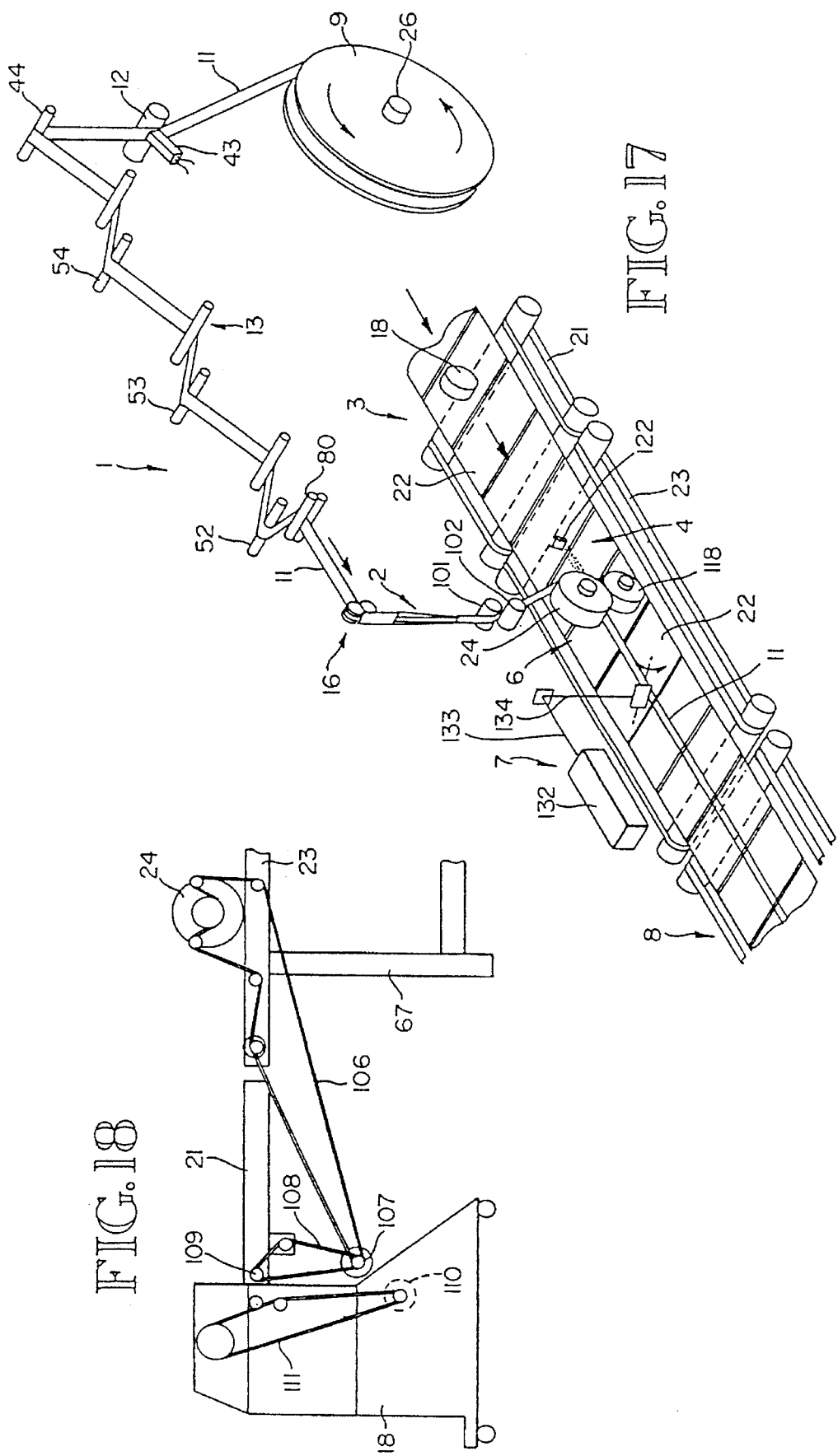

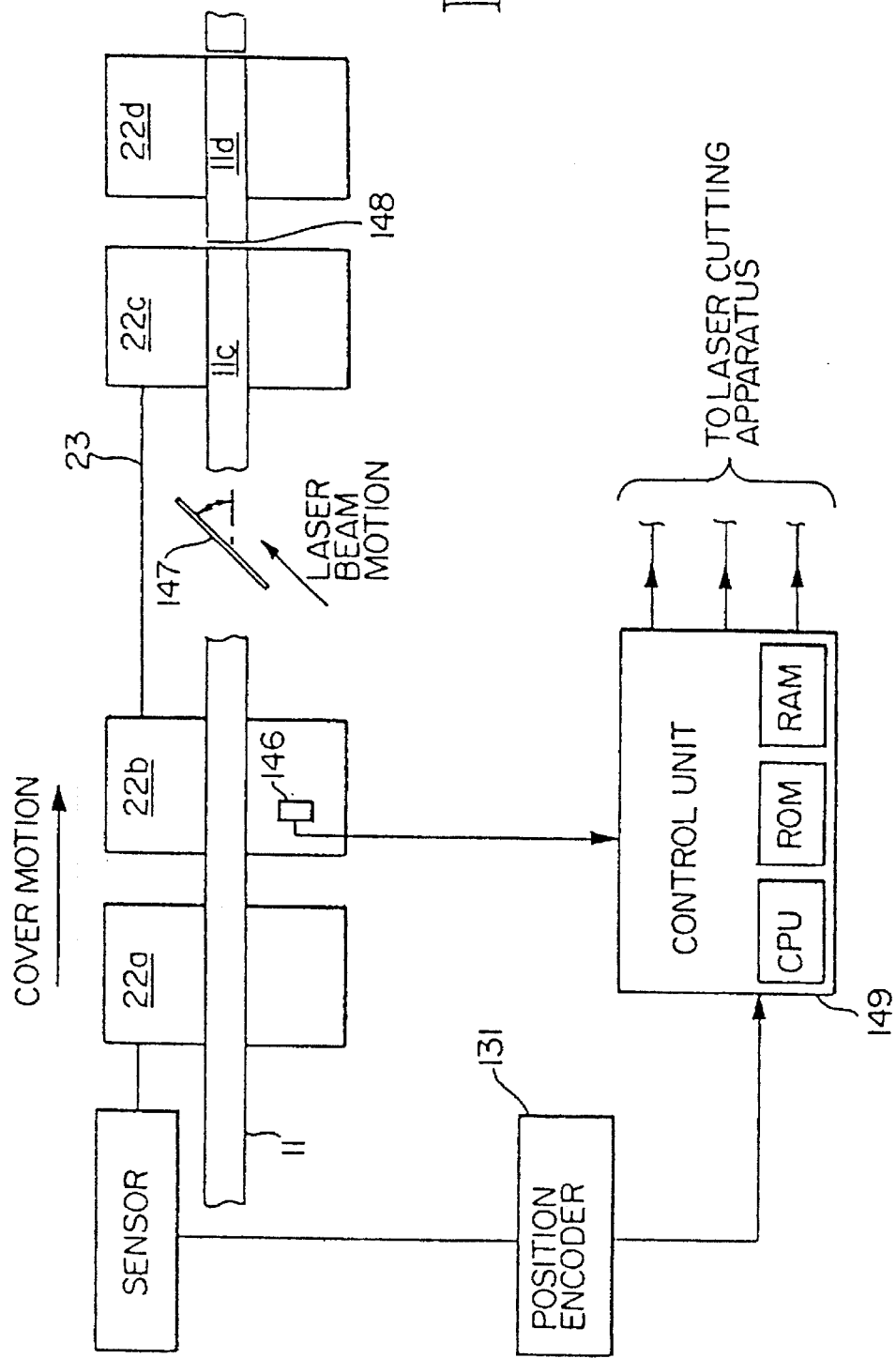

METHOD AND APPARATUS FOR FORMING BOOKBINDING STRIPS

This is a division of application Ser. No. 07/952,604, filed Sep. 28, 1992 now Pat. No. 5,364,215.

BACKGROUND OF THE INVENTION

1. Field of the Invention

The present invention relates to a method and apparatus for preparing book covers for application to a preformed book block such as produced in the well known "perfect binding system" or similar book binding system. More particularly the present invention relates to an apparatus and continuous process for preparing preprinted precut book covers with an independent attachment member which functions as a fastener between the cover spine and the book block spine. The independent attachment member may take different forms but in the preferred form of the invention comprises a novel product of manufacture in the form of a compressed flexible sleeve or tube which connects the two spine areas but maintains them separated for ease of opening while providing maximum strength in the binding and in the connection between the cover and book block. The novel attachment member, which is formed from a single thickness adhesive-impervious technical paper, comprises a continuous, flattened double-walled strip with an overlap longitudinal joint in one wall. The apparatus and method, which includes the on-line formation of the attachment member, operates at extremely high speeds, is exceptionally reliable and thus may be coupled with a perfect binding system or similar binding system as in-line equipment allowing production rates even exceeding those possible with existing binding systems.

In its broadest sense the present inventive concept relates to the preparing of individual blanks, fed seriatim, with continuous formation, application and bonding of a web or tubular attachment member extending along a predetermined section of the moving blank and subsequent separation of the blanks by severing the continuously applied web or tubular member at high speeds.

2. Description of the Prior Art

Methods have been proposed and developed in the prior art for solving the problems encountered in book binding systems such as the well known "perfect binding system" introduced to North America in the late 1880's. As presently developed, the perfect bind system is used to produce mainly soft-cover books such as the well known paper backs including catalogues, phone directories, text books, technical manuals and some periodicals. In this system, the spine of the book block, comprising multiple signatures bound together, is usually glued onto the spine portion of a soft cover over its entire length and width. In some cases the cover is also glued over a certain distance from the back edge of the block onto the first and last leaf of the book block so as to obtain a stronger fastening between the cover and the block. The spine of a book made in this way is rather rigid and the book opens poorly and is thus difficult to read. The spines of such books are readily broken and the first and last leaves of the book block tend to be detached when the leaves are forced open. The term "mousetrapping" is applied in the art to the tendency of perfect bound soft-cover books of the type described to snap shut and resist lying flat on a surface for reading. This problem is well recognized with text books, instruction manuals and the like which must be held or weighted to maintain the open position in use.

Soft-cover book bindings have been devised in the prior art for solving the mousetrapping problem. One such binding utilizes a support layer in the form of a narrow strip or flat, single thickness ribbon, usually of cloth or crepe, glued to the entire spine portion of the book block and to a portion of the first and last leaf of the block. The cover, soft or hard, is then glued to the support layer, usually by strips of glue in the area of the back edges of both the first and last leaf of the block, leaving the spine of the cover separated from the book block spine. Typical of this structure is the U.S. Patent to Eero Jukola U.S. Pat No. 4,299,410. Attempts have been made to automate the manufacture of this type of binding so as to be adaptable to use in perfect binding equipment, but such attempts have not produced satisfactory results. Although preassembled covers are produced by feeding a continuous web of support material onto separately fed covers followed by separation of the covers, speed and reliability allow only for off-line production. The preassembled covers are stockpiled and later fed from a "batch" to the perfect bind equipment. Additionally, "side gluing" devices are essential and must be added to the perfect binding equipment to attach the preformed covers to the book block. Although such an approach may provide an adequate economic alternative in competition with more expensive hard-cover bindings, it is not adaptable to or competitive with mass production of paper back books and hence has not received wide acceptance in the industry.

U.S. Pat. Nos. 951,436 and 998,283 to C. R. Duryea and C. R. Duryea et al respectfully and U.S. Pat. No. 4,547,000 to Pentti Sallinen disclose further prior art methods and construction for solving the problem of "mousetrapping" and breaking of the rigid spine produced by perfect binding. In the Sallinen patent a soft cover is fastened to the book block by means of an independent member such that the spine part of the cover is held apart or separated and not attached directly to the spine of the book block. The independent fastening member, or a plurality of such members, in this case comprises a resiliently compressible sleeve or tube made of paper or other material which is nonpenetrable by glue. If a single tube is used, the circumference of the tube is at least twice the width of the spine of the book block and is preferably equal in length to the height of the spine. The Sallinen patent teaches the gluing of the individual compressed or flattened tube or a number of tubes on one side to the cover spine and on the other to the book block spine. The Sallinen concept also contemplates the use of a sleeve having a circumference greater than twice the width of the spine of the book block. In this form, the sleeve is also glued to the edges of the book block a short distance beyond the back edges of the first and last leaf. This expedient is also used in some cases with prior art perfect binding to obtain a stronger fastening between the cover and the book block. With the Sallinen concept, high strains normally directed at these pages on opening of the cover are thus avoided since the flexible folds in the sleeve between the cover and the first and last pages efficiently attenuate such strains. The Sallinen patent as well as the Duryea patents, however, deal only with the book block and soft cover construction and the method and order of assembling and gluing the individual preformed members. Although the tube or sleeve binding constructions of these patents create a lay-flat, resilient, durable perfect bound book, which functions like a Smyth-sewn, casebound (hard cover) book with the economy of adhesive binding, no process or machine capable of in-line use with perfect binding equipment is available for assembling such bindings. As a result, there has been no widespread commercial acceptance of this type of binding.

U.S. Pat. No. 5,078,424 to Kadish illustrates another form of binding wherein a tubular member provides the fastening means between the spine of the book block and the soft cover. The tubular member is composed of a woven plastic yarn formed preferably from polyester filaments designed to present interstices for the reception of glue. This solution is offered as an alternative to the use of paper tubes, reinforced or otherwise, which are admittedly more economically feasible for mass production of soft cover books. Although the Kadish patent suggests the feeding of covers singly into a stream to receive the tubular ribbon, no apparatus or means for accomplishing this result is disclosed and no steps are suggested for tube formation, unwinding, pulling and uniting with the moving covers. The use of a "hot knife" is suggested for separating the covers by severing the plastic tubular ribbon, but no such apparatus is disclosed. In addition to the difficulties of handling a longitudinally flexible, perhaps even elastic, woven fabric preformed tube, the prospect of cutting plastic tubes with a "hot knife" at the speeds required for efficient binding renders the approach impractical for most applications and unsuitable and inadequate for in-line commercial mass production utilizing perfect binding equipment.

SUMMARY OF THE INVENTION

The present invention for the first time provides a method and apparatus for preparing a book cover, by the application of a separate attachment member for joining the cover to a book block at mass production speeds, whether off-line or in-line, with existing perfect binding equipment. The apparatus includes (1) paper web feeding, (2) ink jet printing for coding job information to the inside of the paper tube, (3) tube forming, (4) simultaneous cover blank feeding, (5) glue application, (6) tube compressing to form a novel double-walled attachment member and bonding with the cover blanks, (7) severing the attachment member or strip to separate the joined covers and (8) off-feeding to existing binding equipment or to stacking bins, all with the reliability and speeds in excess of existing binding equipment.

Rolls of narrow-web technical paper stock are positioned and supported to feed continuously into a tube forming apparatus which longitudinally scores the lateral edge portions of the web and rolls the side edge portions inwardly with an overlap joint to form a continuous paper tube. The novel tube forming apparatus is adjustable to form varying diameter tubes and accurate adhesive free overlap joints at high speeds without weakening the strength of the paper web. The tube is then flattened by forming rolls to create a unique continuous double-walled fastening strip which is directed onto the surfaces of moving cover blanks at speeds required for direct in-line feeding to perfect binding equipment. Cold emulsion adhesive is applied to the spine portion only of each cover and the continuous attachment member is pressed, by means of a pinch roll, and bonded on its lap joint side to the spine portion of the cover surface. Electronic sensors are used to sense the position of the covers emerging from the pinch roll and to actuate cutting means so as to transversely sever the attachment strip between emerging covers and thus separate the spaced, joined covers. In the preferred embodiment, cutting is accomplished by high energy laser beam. Although mechanical or other forms of cutting may be used, the novel laser cutting method enables a clean accurate cut at the high web speeds desired and eliminates maintenance and other machine downtime experienced with conventional cutting, rotary or otherwise, in a manner heretofore unknown in the art.

In the illustrated embodiment the overall manufacturing process involves the steps of (1) feeding glue impervious paper web stock continuously from storage rolls, (2) forming the web stock into a continuous tube, (3) compressing the paper tube to form a flat double-walled attachment member or strip, (4) simultaneously feeding separate covers in spaced relation beneath the path of the moving attachment strip in position to receive one surface of the strip, (5) bonding the strip on one side to a predetermined section of the cover surface, (6) severing the flattened strip to separate the joined covers, and (7) out-feeding the prepared covers with bonded attaching members to perfect binding equipment or other apparatus. The tube, formed into a continuous double-walled attachment strip by the method and apparatus of this invention, is a unique product of manufacture and specially adapted for use in book binding structures of the type under consideration.

In one embodiment of the method, reliable high speed cutting is accomplished by directing a high energy beam in a moving path generally transverse to the path of movement of the joined covers to sever the double-walled attachment strip between the spaced covers to separate the covers. Electronic sensors are used to supply cover position signals as well as conveyor speed to a data processor for controlling actuation and cycling of the cutting means.

BRIEF DESCRIPTION OF THE DRAWINGS

FIG. 2 is an isometric view of the web unwinding and tensioning apparatus;

FIG. 3 is a cross section taken along lines 3—3 of FIG.

FIG. 6 is an isometric view of the infeed and outfeed conveyor sections, tube applicator and cutting stations;

FIG. 7 is an isometric view of the paper web scoring and tube forming apparatus;

FIG. 8 is an isometric detail of the web scoring rollers;

FIG. 9 is a cross section taken along lines 9—9 of FIG. 8;

FIG. 10 is an isometric view showing the details of the tube former apparatus;

FIG. 11 is an enlarged detailed perspective of the tube former;

FIG. 12 is a cross section taken along lines 12—12 of FIG. 11;

FIG. 13 is an isometric view showing the position of the glue dispensing system;

FIG. 16 is an isometric view showing the optical focussing assembly of the laser beam cutting system;

FIG. 17 is a schematic illustration of the travel path of both the paper web and the individual covers through the several steps and operations of the system;

FIG. 18 is a schematic of the cover feeder and conveyor drive system;

FIG. 19 is a schematic showing the relationship of the conveyor travel and laser cutting plane;

DESCRIPTION OF THE PREFERRED EMBODIMENT

Figure 1:
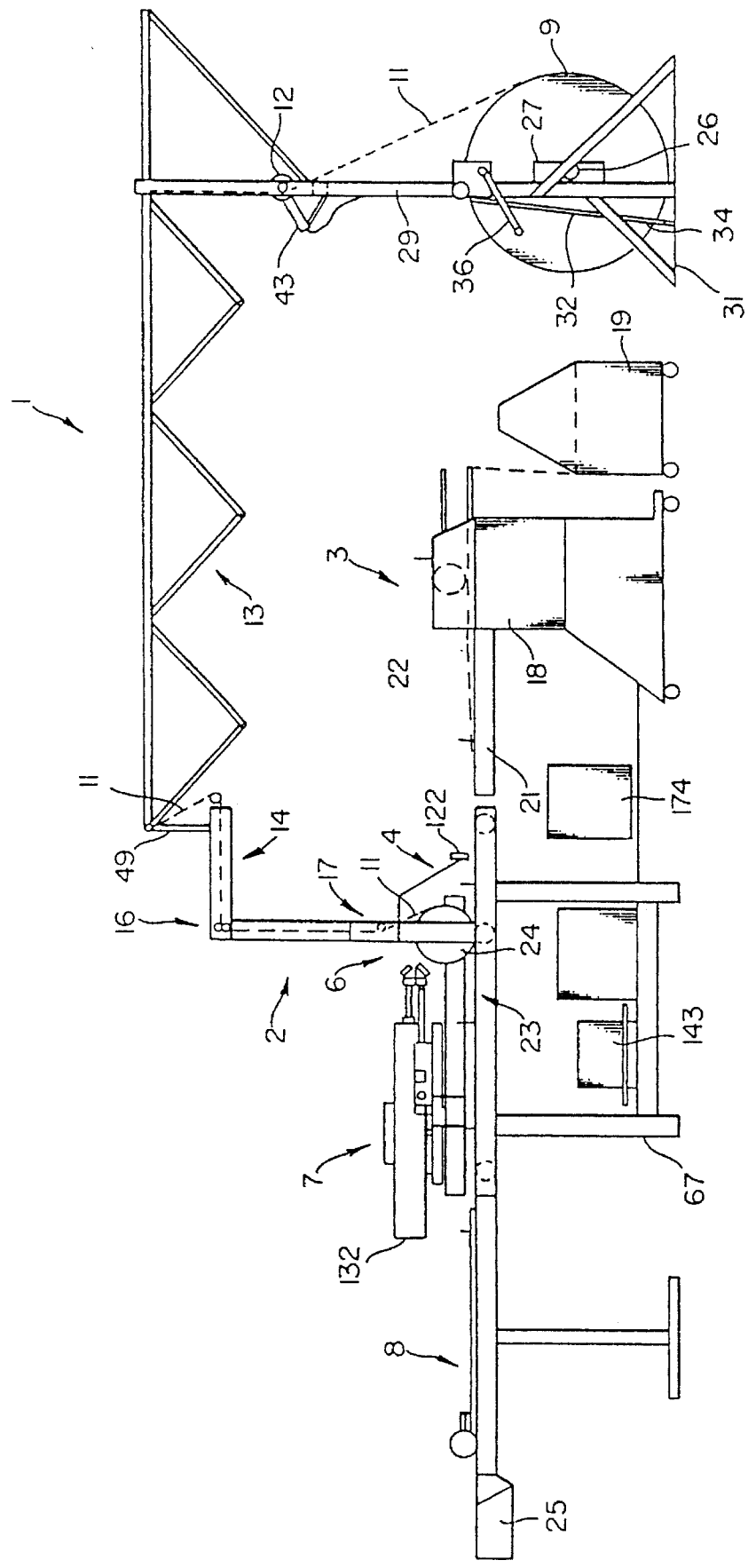
FIG. 1 is a schematic view showing the overall configuration of the apparatus for forming the attachment members, applying them to the preprinted covers and severing the web between covers, ready for reception by perfect binding machine.

Referring to FIG. 1 of the drawings, the book cover preparation system and apparatus includes a paper web supply section and ink jet imprinter indicated generally at 1, a tube forming section 2, a cover feeder section 3, glue dispenser 4, tube applicator 6, web cutting station 7 and cover discharge transport section 8. In general, a supply roll 9 of a narrow web of technical paper 11 is positioned and mounted for unwinding under constant tension. The paper web or strip 11 is directed vertically by the guide roller 12 and is passed through a device known in the art as a "dancer" indicated generally at 13 in FIG. 1. As will be presently described in detail, the paper web is pulled from the roll 9 by the action of pinch rollers at the tube applicator station 6 and constant tension is maintained in the web by means of the dancer apparatus. Web movement sensor means are employed to control an electric breaking device to halt the rotation of the supply roll 9 in the event of a web break. The dancer apparatus 13 functions to expand or contract in accordion fashion to take up any slack and to thus maintain constant tension in the moving web. The web 11 is pulled through a horizontal alignment device 14, between the lateral edge scoring rolls indicated generally at 16, and thence downwardly through the tube forming section 2 which functions to form the flat paper web into a continuous tubular member having an overlapping adhesive-free longitudinal joint. The longitudinally scored lateral edges of the web provide for precise fold lines which form the lateral edges of the double-walled attachment strip when the tube is passed over or between the forming rolls indicated generally at 17.

The paper tape or web of the present invention will range in width from 2 to 8 inches depending on the width of the spine area of the book block for which it is intended. The width will normally be at least twice the width of the book block spine plus an allowance for the overlap joint of from ⅛ to ¼ inches. The material of the web must be a technical paper which is flexible and essentially non-penetrable by glue in order that the two walls of the finished flattened tube may remain separate after one is glued to the cover spine and the other glued to the book block spine. Additionally the technical paper must have the requisite tear and tensile strength to withstand the scoring and folding operations during fabrication and to function as a book binding attachment means capable of withstanding the high level strains normally associated with book cover applications.

Simultaneously with the pulling and continuous formation of the tubular attachment strip, individual precut book cover blanks are fed seriatum in predetermined spaced relationship at the cover feeder section 3 of the system. The cover blanks are preprinted and precut to size ready for final blocking in the perfect binding machinery. These covers are usually made of soft flexible paper material that has been parallel scored in the central portion to define a spine area for reception of the book block spine. The covers are fed with the inside face up and the centrally defined spine area extending longitudinally in the direction of travel. The cover feeder unit 18 may be of any known prior art design which is capable of feeding individual covers from a stack indicated schematically at 19 onto an infeed conveyor or transport table 21. The feeder in the present embodiment may be controlled to deliver the cover blanks onto the transport 21 at the rate and with the accurate spacing required for the present operation. Uniform spacing of approximately ¼–½ inches is maintained between the advancing covers and precise alignment is maintained on the infeed conveyor system.

As the covers, indicated generally at 22, move along the transport 21 onto the machine transport table 23 precise longitudinal alignment is maintained and the glue dispenser apparatus 4 dispenses a predetermined pattern of cold emulsion adhesive onto the spine section only of each individual cover blank. The cover blanks are immediately fed beneath the pinch roller 24 in the tube applicator section 6 of the machine while the cold adhesive is tacky, ready for reception of the flattened tube. As previously described, the pinch roller 24 also serves to pull the endless paper tube about its periphery and to thus apply the flattened tubular strip directly to the glued spine portion of each blank as it passes underneath the roll. It will be understood that the paper tube which has now been flattened is a double sided strip with one side having the lap joint created by the tube forming apparatus 2. The overlapped side of the flattened double walled attachment member is applied to the glue bearing spine portion of each cover blank. As the blanks pass beneath the pinch roller 24 they become joined in a continuous string of covers attached to the flattened tubular member and, since the paper web is glue impervious, the top wall of the attachment member is left completely free to be later glued to the book block spine. As the covers proceed beyond the pinch roller 24, a sensor detects the position of the forward edge of the advancing cover blank and actuates the laser cutting device embodied in the web cutting section 7. The cutting of the tubular strip at a precise location adjacent the leading edge of each cover blank is controlled in response to a position sensor, which locates the forward edge of each oncoming cover, and the constantly monitored conveyor speed. Once the covers are separated with their double walled attachment members glued thereto they are carried by the discharge transport 8 to either a stacking bin, indicated schematically at 25 for off-line feeding to a perfect bind machine, or formed into a shingled pile for direct feeding into the perfect bind system.

WEB FEEDING

FIGS. 2–5 illustrate the details of the paper web supply section 1 of the device. The paper web in the present embodiment is wound on a web reel or carrier 9. The reel 9 is provided with a rotary hub 26 mounted for rotation in suitable journal blocks 27 and 28 carried on the vertical frame members 29 which are attached to the base plate 31. These members may be provided with the necessary bracing such as illustrated to maintain the vertical frame members and base plate rigid. The reel 9, shown by way of example, may be initially lifted and mounted into the journal blocks by means of a suitable elevator mechanism such as the crank and lift chain arrangement shown. The chains 32 and 33 may be attached at one end to the reel hub 26 and dead-ended at the other end on the base plate 31 via spring members 34.

Figure 4:
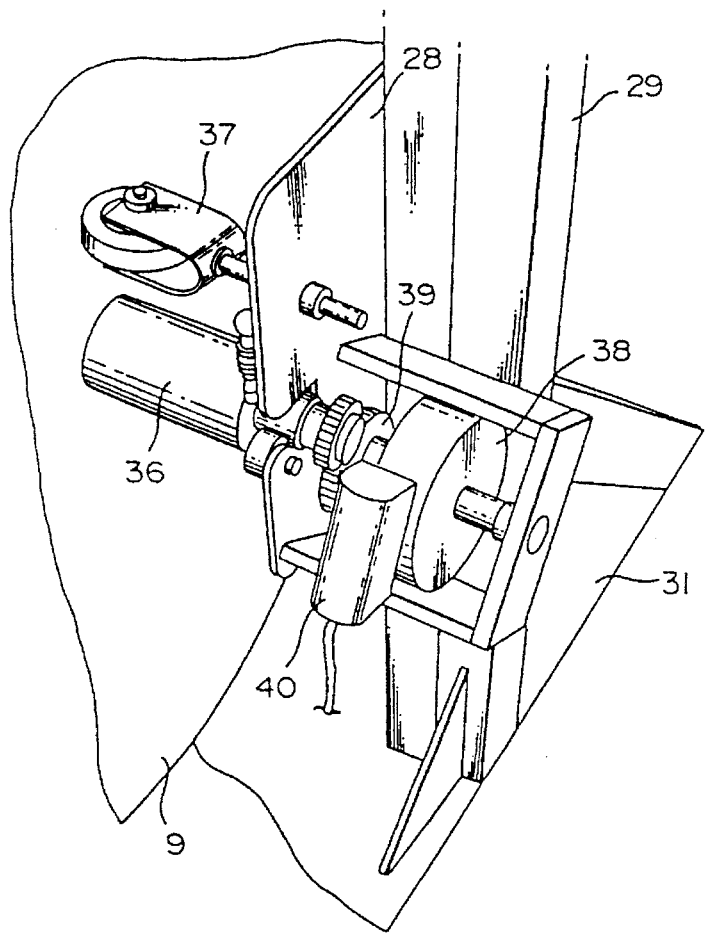
FIG. 4 is an isometric detail view of the web roll brake.

The chains pass over suitable ratchet and gear members (not shown) operated by the hand crank 36. Although the particular reel elevator system is shown by way of example, it will be understood by those familiar with the reel winding arts that any number of arrangements may be utilized to position the rolls in their bearings. The reel 9 may be provided with an adjustable guide wheel assembly 37, as seen in FIG. 4, to maintain smooth rotation.

It will be understood that the web reel 9 is normally freely rotatable during the web unwinding procedure. In the event of a release in the pulling force on the web for any reason such as web breakage, it is desirable to immediately halt rotation of the web reel for obvious reasons. An electric brake assembly indicated at 38 is connected by a suitable gearing arrangement 39 to the shaft 26 and is actuated by an electric control unit 40 also mounted on the journal block 28. The electrical control unit 40 is actuated by a web travel sensor presently to be described.

As the web 11 is pulled from the reel 9, it travels generally vertically and is passed over the guide roller 12 which directs the web vertically. The guide bar or roller 12 is provided with alignment flanges 41 and 42 in the form of circular discs to insure the central positioning of the web on the guide roller. The web is imprinted at this point with informational material utilizing any suitable printing means such as a commercially available ink jet printer indicated at 43. The ink jet printer will be understood to have its own control system which may be disabled in the event of a system shut-down. The printer head may be positioned adjacent the guide bar or roller 12 to provide a solid backup surface for the web being printed. It will also be noted that information is printed on the central portion of the side of the web which is located on the interior side of one wall of the finished double-walled attachment member so as to be readable once the book is bound. From the guide roller 12 the web is pulled vertically and passes about a second guide bar or roller bar 44 mounted between the upright frame members 29. From the guide bar 44 the web enters the dancer mechanism 13 which comprises a series of movable roller bars suspended from two horizontally extending parallel rails 46 and 47. As shown in FIG. 2, the rails are fixed to and supported at one end on the stationary cross member 48 fixed to the vertical frame members 29. The other ends of the rails are supported by the vertical legs 49 and 51 which are attached to the distal end of the cantilevered frame of the alignment device 14 as shown most clearly in FIG. 1. Three transversely extending roller bars 52, 53 and 54 are provided with roller mounted hangers 55 which are freely movable longitudinally within the dancer rails 46 and 47 as illustrated in FIG. 3. The roller bars may be freely rotatable tubular sleeve members mounted on cross rods or may be provided with end bearings. In any event, the roller bars 52, 53 and 54 should be constructed so as to allow the web 11 to be pulled freely over the bars with minimum resistance. The roller bars are connected via articulated side links such as the links indicated at 56 and 57 to the intermediate roller bars 58, 59 and 60 which may be of identical construction as the roller bars 52–54. The web member 11 is trained over the stationary roller bar 44 and alternately under the roller bars 58–60 and over the roller bars 52–54 and from thence is directed into the horizontal alignment frame 14 as shown in FIG. 7. In order to maintain constant tension in the moving web, the dancer apparatus is connected via cables 61 to suitable counterweights 61a located inside the vertical columns 29. The cables 61 are trained about suitable pulleys 62 fixed to the top ends of the columns 29 and are attached to the opposite ends of the roller bar 53 as shown in FIG. 2. It will be understood that the pinch roller 24, presently to be described in detail, exerts a constant pulling force on the web and the dancer maintains a constant counter pull by means of the cables 61 and the counterweights 61a to maintain the system in balance. The dancer mechanism will assume a particular expanded configuration such as illustrated in FIGS. 1 and 2 during normal operation and will expand and contract to absorb any web slack so as to maintain constant tension in the web.

Figure 5:
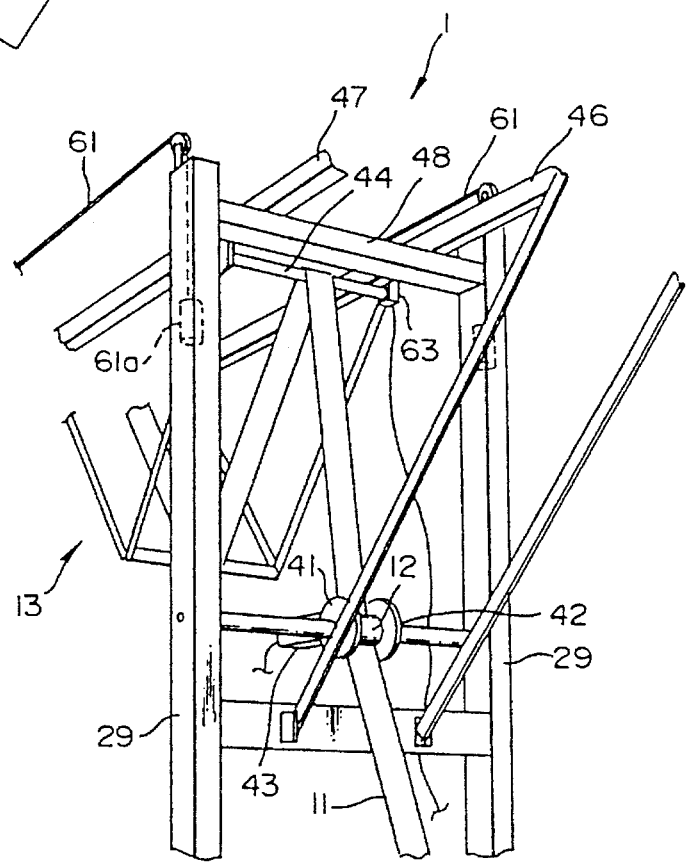
FIG. 5 is an isometric detail view of the web guide apparatus and location of the web movement sensor.

The fixed guide bar 44 which may comprise a rotatable sleeve on a cross shaft is connected to operate an on-off sensor switch 63 as shown in FIG. 5. The switch is a two position rotary switch serving to actuate the brake control 40 to stop rotation of the reel 9. Thus, while the tape is moving forward, the guide bar 44 is rotated in a direction to hold the switch in the off position. If, for any reason, the web is broken and reverses direction, the switch 63 moves to the "on" position to actuate the brake control 40 to set the brake on the reel. This is a safety measure to prevent further unwinding and loss of the web 11.

TUBE FORMING APPARATUS

FIGS. 1 and 6 illustrate the general positioning of the tube forming mechanism relative to the machine frame. The main frame of the machine includes the side rails 64 and 66 supported by the legs 67. The tube forming apparatus is mounted in an upright vertical frame carried on a cross member 68 elevated above the pinch roll 24 by means of the uprights 69 and 71. The tube former frame comprises the upright side frame members 72 and 73 which are fixed to the cross member 68 and may be joined along their length by means of cross bars 74 and 76 which also serve as mounting means for the backing plate 77 affixed thereto as illustrated. Horizontal rearwardly directed support rails 78 and 79 are attached at their forward ends to the top ends of the uprights 72 and 73 and form the framework for the web alignment device 14.

As shown most clearly in FIG. 7, the web 11 enters the alignment apparatus as it passes about the guide roller 80 and between the upper and lower guide plates 81 and 82 respectively, shown most clearly in FIGS. 6 and 7. The alignment device also includes the slidably adjustable lateral guide rails 83 which precisely position the moving web for engagement by the adjustable scoring wheels 84 and 86. The wheels 84 and 86 are provided with circumferential ridges or beads for scoring purposes as illustrated and are mounted on the transverse shaft 87 carried in suitable journal bearings 88 and 89 for free rotation. The scoring wheels, shown in detail in FIGS. 8 and 9, are laterally adjustable on the shaft 87 by set screw means or the like as illustrated. The ridges of the scoring wheels contact the lateral edge portions of the moving web and cooperate with the backup roll 91, mounted on the freely rotatable shaft 92, directly below the scoring wheels. The backup roll 91 has a rubber or other deformable non-metallic surface which deflects under the pressure of the wheels 84 and 86 to perform the scoring action. As illustrated in FIG. 7, the shaft 87 is vertically adjustable by means of adjustment screw members in the bearings 88 and 89 to apply a predetermined pressure and deformation of the surface of the backup roll 91 by the circumferential beads or ridges on the rollers 84 and 86. As will be appreciated, the moving web which passes between the rollers 84 and 86 and the backup roll 91 will be scored along its lateral edges in a continuous parallel manner. The distance between the score lines is adjustable by moving the scoring wheels and will be dependent on the desired width of the flattened attachment member. The width of the attachment member will, of course, be dictated by the size of the book block to be covered. The score lines serve to precisely locate the fold lines along the edges of the finished tube.

Referring to FIGS. 10–12, the actual tube formation is accomplished by the apparatus on the backing plate 77 which includes the two horn-like forming members 92 and 93 and the laterally spaced shoe members 94 and 96. The two shoe members 94 and 96 have a flat ski like configuration and may be made of sheet metal or the like so as to be flexible with some spring action. The shoes are mounted on the cross member 97, as shown in FIG. 7, and may be laterally adjustable by such means as the clamping blocks 95 illustrated. These shoes are designed to contact the paper web along the scored or folding lines as the web moves into the tube forming contact with the horns 92 and 93. The shoe members are parallel and free at their lower ends so as to facilitate the folding action of the web sides along the scored lines. The shoe members also function to maintain the moving web flat against the backing plate 77 during the tube formation.

The horns 92 and 93 have a helical twist from top to bottom as shown in FIGS. 10 and 11. Each of these horns is laterally adjustably mounted by means of the clamping members 98 and 99 received in associated slots in the backing member 77. It will be understood that the top ends of the horns are provided with identical laterally adjustable mounting means (not shown). The horns 92 and 93 are vertically offset and the horn 93, being flatly engaged with the backing plate 77 on its top end, curves over in helical fashion to guide one side edge of the web 11 so as to fold on itself along one longitudinal score line as viewed on the left side of FIG. 11. During this action, the web is being held against the backing plate 77 by the shoes 94 and 96. The second horn member 92, which also lies flat against the backing plate 77 at its top end, curves over the opposite side edge of the moving web and over the top of the bottom end of the horn 93. The horn 92 serves to fold the opposite lateral edge of the web, along its score line, over the bottom end of the horn 93. The web is thus folded along its score lines with one side of the double wall being overlapped and initially flattened by the bottom end of the horn 92 as it emerges form the tube former. The forming rollers 101 and 102 are mounted on vertically adjustable offset cross shafts 103 and 104 respectively which cause the folded double sided tube to be completely flattened. The flattened tube with its overlap joint is now ready for passing about the pinch roller 24 which actually serves to pull the web through its various forming stages described.

COVER FEEDING

Simultaneously with the unwinding of the web and the tube formation, the individual precut book covers are fed at a predetermined speed and with a predetermined spacing by the cover feeder 18 onto the cover infeed conveyor table 21. Referring to FIGS. 6 and 18, the cover feeder 18 may be a commercially available apparatus which is capable of feeding covers at the required rate and accurate spacing according to the present system. The infeed conveyor table 21 is actually driven by the electric motor drive system of the feeder. The cover feeder drive may also be utilized to power the main conveyor transport table 23 as well as the pinch roller 24 as illustrated schematically in FIG. 18. The chain drive member 106 is driven by a sprocket 107 which takes its drive from the chain 108 connected to the sprocket 109 of the infeed conveyor driven shaft. The infeed conveyor belts are, of course, driven by the electric motor 110 by means of the chain 111 which also drives the feed roller 112 of the cover feeder 18 as illustrated. In this manner, the cover infeed conveyor, main machine conveyor and the pinch roll which pulls the paper web have a common chain drive and operate at precisely the same speed. It may be noted here that the off-feed conveyor table 8 in the present embodiment has its own drive (not shown) which may not necessarily operate at the same speed as the other conveyor belts. The off-line stacking and even the in-line feeding to perfect bind machinery may require different speeds depending on the particular installation.

The cover infeed conveyor table 21 may comprise multiple belts which convey the individual covers 22 forwardly as shown in FIG. 17. As is common practice in sheet feeding, alignment of the moving covers is accomplished by the use of overhead ball guides such as illustrated at 113 in FIG. 6. The guides consist of an elongated bar with holes that contain freely running ball members which contact the moving cover sheet and, depending upon the orientation of the bar, serve to guide the moving cover to one side or the other. In the present embodiment, the ball guides in the bars 113 urge the oncoming covers against the guide rail 114 which extends the length of both conveyor tables 21 and 23. This means of conveying and aligning moving sheet stock is well known in the art and further detailed description is therfor omitted. The transport table 23 is also provided with a plurality of parallel overhead ball guide bars 116 which may be identical to the bars 113 and which cooperate with the associated drive belts 117 to move and guide the cover blanks as described. With this arrangement, it will be seen that the spaced covers move from the infeed conveyor 21 to the transport table-23 and pass between the upper and lower pinch rolls 24 and 118 respectively. From the pinch rollers, the covers pass through the laser cutting station 7 and, after being separated, are carried off by the cover discharge transport 8.

ADHESIVE APPLICATOR

Figure 14:
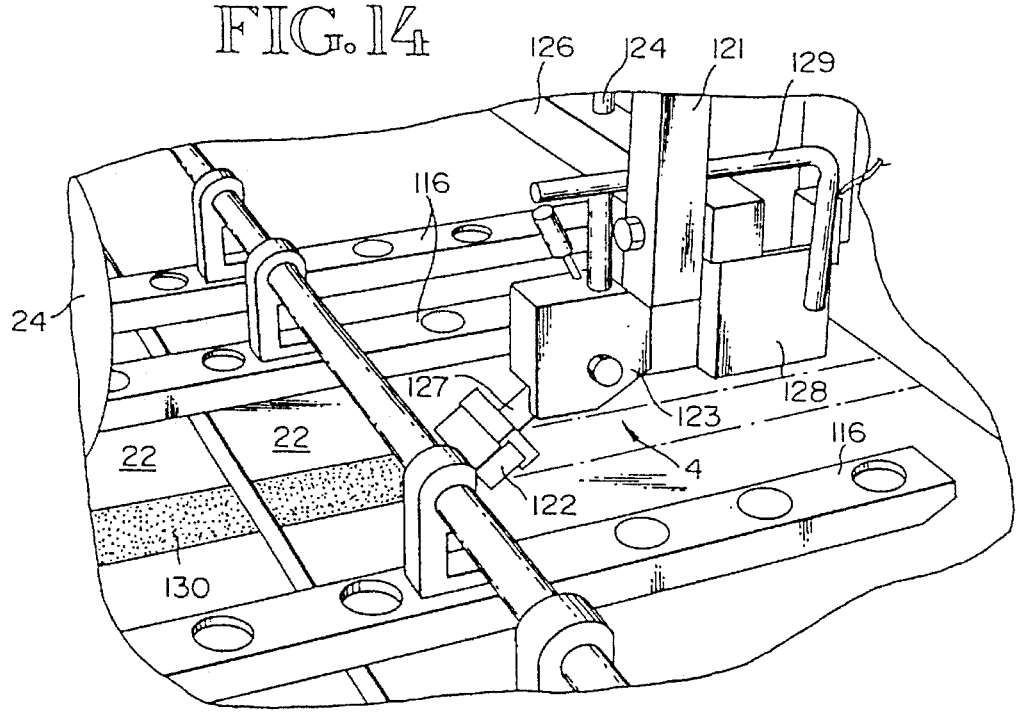
FIG. 14 is an isometric detail of the glue dispenser system.
Figure 15:
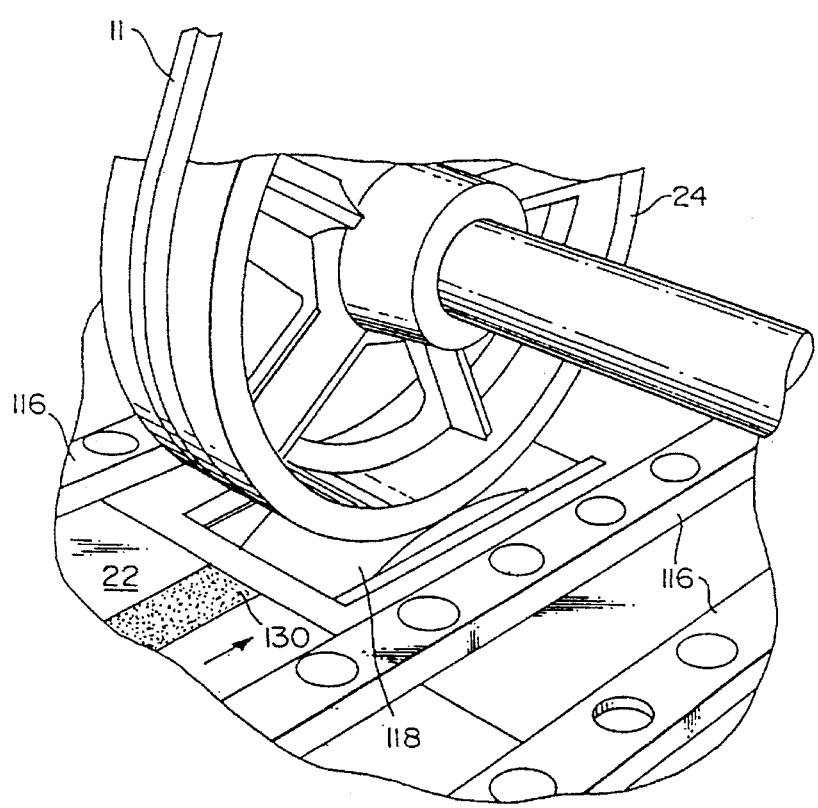
FIG. 15 is an isometric view showing the pinch rollers for applying the tubular attachment member to the book covers.

As the individual covers approach the pinch roller 24, they pass beneath the glue dispenser station 4 which applies a cold melt adhesive to the surface of each individual cover in a predetermined pattern. Although the drawings, FIGS. 14 and 15, illustrate a single band of glue being applied, it will be understood that the adhesive may be extruded onto the covers in the form of a plurality of spaced beads or glue lines as desired. As aforementioned, the covers 22 are normally prescored to define the spine area of the cover designed for reception by a particular book block. Although the present embodiment illustrates the application of adhesive beyond the confines of the scored spine area of the book cover, see FIG. 25, it is also desirable for some applications to confine the adhesive application within the parallel score lines and spine area of the cover.

Referring specifically to FIGS. 6, 13 and 14, the adhesive applicator in the present embodiment is mounted on the cantilevered arms 119 and 121 extending from the crossbar 68 of the frame and is located on the infeed side of the pinch roller 24. The applicator head 122 is adjustably mounted in the hanger support 123 carried on the support post 124 received in a mounting bar 126 which extends between the cantilevered support arms 119 and 121. The applicator head is adjustably mounted about a horizontal axis and the hanger 123 may be vertically adjustable by means of the post 124 received in the bar 126. The applicator head is aligned with the pinch roll 24 such that the web member 11 will be laid down on the predetermined area of the spine portion of the cover to which the adhesive is applied. The covers may be aligned laterally by adjustment of the guide rail 114 which extends along the length of both the conveyors 21 and 23. The applicator head 122 is connected to an adhesive conduit 127 which receives adhesive under pressure from suitable conduits (not shown) connected to a glue supply. A photocell sensor 128 is mounted upstream of the applicator head 122 and may be fixed to a support member 129 mounted on the cross bar 126. As will presently be described in more detail, the photocell unit 128 serves to signal the approach of the forward edge of a cover on the conveyor 23. The entire glue applicator system, including the glue supply, applicator head, photocell sensing unit and electronic controls therefor may be any one of a number of commercially available cold melt extrusion systems the details of which form no part of the present invention. Regardless of the adhesive system used, the cold emulsion adhesive will be chosen so as to be in the ideal tacky consistency as the tubular attachment member is pressed onto the spine portions of the moving covers by the pinch roll 24 as shown in FIGS. 13 and 15. The spaced covers are first provided with an application of glue indicated at 130 by the applicator head 22 and are conveyed between the top and bottom pinch rollers 24 and 118 respectively which press the flattened tubular member 11 onto the glued spine of the cover in a precise location. Since the tubular member 11 is continuous, the covers emerge from between the pinch rollers connected to each other by the continuous flattened tube 11 as illustrated in FIGS. 16 and 17.

In addition to the photocell sensor 128, a belt travel encoder 131, shown in FIG. 13, is provided on the transport table 23 and continually monitors the conveyor belt speeds as a control element for the operation of the gluing system as well as the laser cutting apparatus to be described. Briefly, the glue system control cycles by receiving a signal from the photocell 128 and, with the belt speed being known, initiates the glue extrusion after a predetermined delay. The glue extrusion continues for a predetermined duration, depending on the length of the cover and then shuts off. This cycle is repeated as each cover passes through the glue applicator station.

WEB CUTTING

As shown in FIGS. 1, 6 and 16–17 the web cutting section 7 of the apparatus is located directly downstream from the pinch roller 24 and comprises a laser beam delivery system which includes a laser power head 132, beam discharge and guide tubes 133 and 134, and an optical focusing assembly 136. A number of commercially available, state-of-the-art laser power heads are now available for high speed industrial cutting applications. The laser head 132 may be any one of a number of available systems rated as Class 4 laser heads and needs only to have sufficient wattage and beam quality for the particular web material being cut at the required speeds in order to make a clean cut.

From a structural standpoint and referring to FIGS. 6 and 16, it may be seen that the laser beam delivery system, including the laser head guide tubes and optical focusing assembly is conveniently mounted on a flat support shelf or plate 137 which is fixed to a longitudinal support beam 138 carried on the machine frame. The plate 137 provides a support platform for the laser beam delivery system and is located overhead of the machine conveyor table 23. A moving laser cutting beam 139 is focused in the plane of the covers and attachment members on the conveyor to make a transverse cut across the width of the attaching members. In order to obtain a clean transverse cut across the width of the attachment member and between the spaced covers, the optical focusing assembly is seen to be oriented at an angle with the longitudinal direction of travel of the conveyor. The details of the cutting procedure will be presently described with reference to the flow chart and control system diagrams of FIGS. 19 and 20.

Referring to FIG. 16, it will be understood that the moving laser cutting beam 139 indicated by the dotted line positions in FIG. 16 is emitted from the left hand end of the assembly 136 as a result of an oscillating mirror under the control of the galvanometer 141 carried by the assembly. A transparent safety shield 142 may be attached to the bottom side of the optical assembly and serves to prevent accidental contact with the cutting beam while the laser system is in operation. The slotted opening 140 is provided in the conveyor table to allow for passage of the laser cutting beam. As shown schematically in FIG. 1, a laser beam dump 143 will be provided beneath the conveyor to receive and dissipate the beam energy and to remove spent particles or debris in a well known manner. This beam dump will normally be provided with an anodized bottom surface, a vacuum exhaust system and a cooling fan. The optical focusing assembly 136 is also provided with a bracket 144 for adjustably supporting a photocell sensor 146 to provide a signal indicating the approach of the forward edge of an oncoming cover to be cut.

Figure 20:
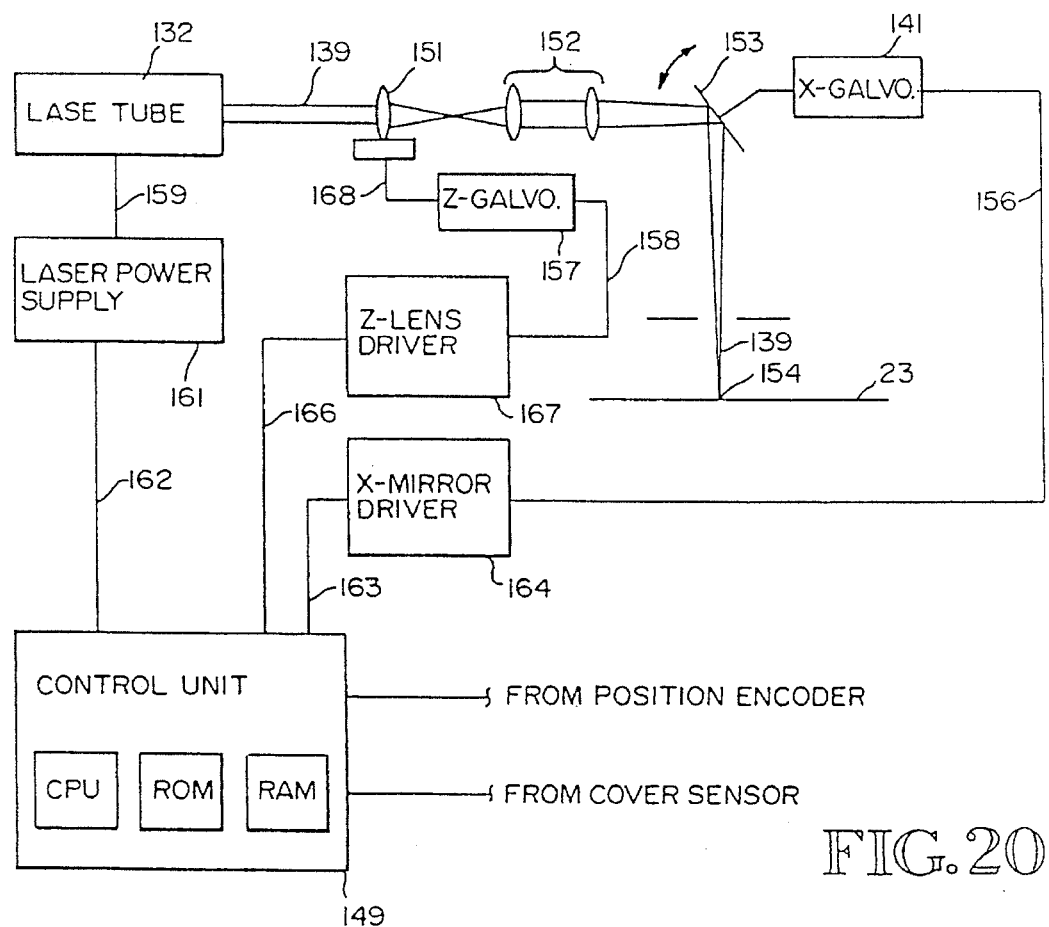
FIG. 20 is a functional schematic of the optical control system for the laser cutting device.

FIGS. 19 and 20 illustrate schematically the laser beam cutting system and its application to the moving covers and continuous attachment member. As seen in FIG. 19, a number of covers 22a–22d are conveyed in alignment by means of the conveyor 23. Covers 22a and 22b have not passed through the laser cutting plane 147 and are still attached together by the continuous member 11. Covers 22c and 22d have been separated by the laser cut 148 made as the covers passed through laser cutting plane 147. The laser cutting motion is synchronized by control unit 149 to the cover conveyor motion in such a way that the resulting laser cut 148 is made essentially "square" across the paper tube.

The position encoder 131 is attached to the conveyor 23 and provides a conveyor speed output signal to the control unit 149. The cover position sensor or photocell unit 146 detects the presence of a cover and provides an output signal to the control unit 149. The control unit 149 typically contains a CPU, ROM, and RAM and functions to control the laser cutting apparatus in synchronism with conveyor motion and cover position as detected by cover position sensor 146. The laser beam motion is confined to the vertical plane 147 which is perpendicular to the cover and conveyor plane with the plane 147 being at an angle of approximately 37° to the direction of cover motion. The particular angle in the preferred embodiment allows the laser cutting apparatus to cut a 3 ⅝ inch paper tube with a square cut about every six inches of conveyor travel as an example. It will be understood that the particular angle of the plane 147 is chosen as a function of conveyor speed, width of the covers and width of the tubular attachment member 11.

Referring to FIG. 20, laser cutting is accomplished by the laser beam 139 produced by the laser tube 132, focused by lenses 151 and 152, and deflected by mirror 153 onto the plane of conveyor 23 in a tightly focused spot 154. Laser beam motion across the plane of the conveyor 23 is produced by oscillation of the mirror 153 driven by the x-axis galvanometer 141 and driver 164 through the connection 156. The laser beam is kept in tight focus at the plane of the conveyor 23 during motion by moving the lens 151 in synchronism with the mirror 153 by means of a z-axis galvanometer 157 via the connection 158. The laser tube 132 is connected by a cable 159 to the laser power supply 161. The control unit 149 turns the laser beam 139 on and off via the laser power supply control signal on line 162 and sets its intensity level while in the "on" position. Thus, the faster conveyor 23 moves the covers 22, the more beam intensity is required to make a cut. The control unit 149 senses the conveyor speed by means of the position encoder input signal from the encoder 131 as previously described.

The control unit 149 determines the laser beam spot 154 position by sending a position signal on the line 163 to the x-axis mirror driver 164 which in turn controls the x-axis galvanometer 141 via the connection 156. In a similar fashion, control unit 149 keeps the laser beam focused on the plane of conveyor 23 by sending a position signal on line 166 to z-axis lens driver 167 which in turn controls z-axis galvanometer 157 via the connection 158. The z-axis galvanometer 157 moves focusing lens 151 via a suitable connection 168.

It will be apparent to those skilled in the art that the required position of mirror 153 and focusing lens 151 relative to the position of the cover 22 as it moves through laser cutting plane 147 is determined by trigometric equations. Because this relationship is fixed by the design of the apparatus, the positional relationship of mirror 153 and focusing lens 151 relative to the cover motion can be calculated ahead of time and stored as a table in the ROM of the control unit 149. This approach eliminates the time that would otherwise be required during cutting to calculate new positions for mirror 153 and focusing lens 151. As the position of cover 22 changes, new positions for mirror 153 and focusing lens 151 are read from the ROM and sent to the x-axis mirror driver 164 and z-axis lens driver 167.

As mirror 153 begins to move at the beginning of a cut, laser beam 139 is turned on by control unit 149 via the laser power supply control signal on line 162. The beam intensity is also set depending on the speed of conveyor 23 as sensed via the conveyor position signal from the encoder unit 131. Several times during the cut the beam intensity is adjusted to match the constantly monitored conveyor speed. At the end of the cut, laser beam 139 is turned off. As the cover 22 continues to move through the laser cutter plane 147, mirror 153 is returned to its starting position (retraced) ready to make the next cut. Retracing typically occurs quickly so that the apparatus is ready to make the next cut as soon as possible after the current cut. For safety reasons control unit 149 monitors all parts of the apparatus to verify proper operation before laser beam 139 is turned on.

SYSTEM OPERATION

Figure 21:
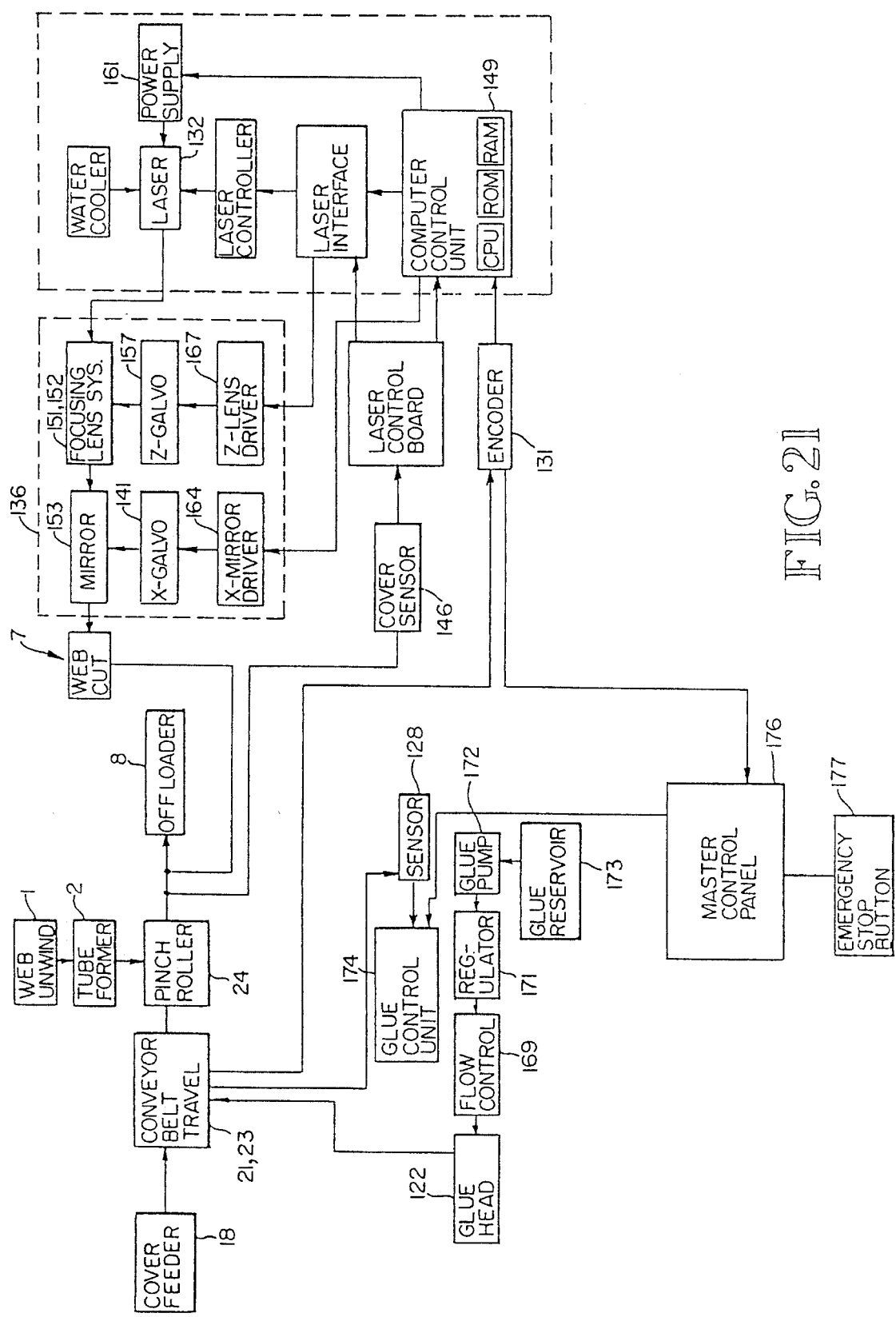
FIG. 21 is a flow chart of the overall functions of the book cover preparation system.

FIG. 21 is a flow chart representing the components of the system and the overall method steps involved in preparing book covers for perfect binding according to the present invention. The cover feeder 18 functions to feed individual preprinted precut covers at a predetermined rate and with a predetermined spacing between covers. The cover feeder drive is used to power the infeed conveyor table 21 as well as the main transport table 23 and the pinch roller 24 for pulling the paper web. The off-loader transport table 8 may have its own independent conveyor drive. The present system is designed to operate at up to 18,000 cycles per hour, a cycle referring to the production of a single 12 inch book cover spine length. The production rate for perfect binding machinery is well under this rating. This rate of production contemplates a conveyor belt speed of approximately 60 inches per second with a gap between covers ranging from ¼ to ½ inch.

The web stock of technical paper is pulled through the web unwind section 1 and the tube former section 2 by means of the pinch roller 24 which presses the double-walled tubular attachment member onto the surface of the spine portion of each cover fed beneath the roller. Prior to being joined with the attachment member, the glue head 122 extrudes a predetermined pattern of cold emulsion adhesive onto a predetermined area of the book cover which will include the spine portion. The glue head 122 is part of an electronically controlled gluing system which includes a flow control 169, regulator valves 171, a glue pump 172 and a glue reservoir 173. The adhesive system is controlled by glue control unit 174 which receives a cover position signal from the photocell sensor 128 as well as a conveyor speed signal from the encoder 131 through a master control panel 176. The master control panel 176 will include an emergency stop button 177 for shutting down the system, including the cover feeder, conveyor tables, pinch roller and gluing system in the event of a malfunction such as a break in the web stock. The glue control unit 174 controls the normal cycling of the glue extrusion system such that glue extrusion will be initiated after a given time delay once the photocell sensor 128 signals an oncoming cover, the delay depending on the speed of the conveyor as monitored by the encoder 131. The glue extrusion will continue for a predetermined duration again dependent upon the speed of the conveyor and width of the covers. After the predetermined duration, the glue extrusion is cut off and the cycle is complete. The cycle is repeated each time an advancing cover is sensed by the photocell sensor 128. The continuous tubular attachment member is glued onto the surface of each of the cover blanks as they pass between the pinch rollers 24 and 118 producing a continuous string of covers.

The tubular attaching member or web is cut between the spaced covers at the web cutting station 7. As previously described, the control unit 149 receives a signal from the conveyor speed encoder 131 and the cover sensor photocell 146 through the laser control board. The laser system will have its own laser controller and a laser interface which receives signals from the laser control board and from the control unit 149. The control unit 149 controls the actuation of the laser power supply 161, the laser unit 132, the x-axis mirror driver 164 and the z-axis lens driver 167 through the laser interface. The optical focusing assembly 136 which receives the laser beam from the laser unit 132 also houses the oscillating mirror 153, the focusing lens system 151, 152 and the x and z-axes galvanometers for driving these units. The optical focusing assembly 136 controls the sweep and focus of the cutting beam 139.

The laser beam cutting system cycles by sensing the presence of a cover by means of the sensor 146 which signals the control unit 149. The control unit 149 also receives an input signal from the encoder 131 representing the speed of the conveyor 23. The laser beam 139 is turned on by the control unit 149 and its intensity level is set as a function of the conveyor speed. The control unit 149 determines the laser beam spot 154 through the x-axis mirror driver 164 and the x-axis galvanometer 141 rotates the mirror 153 to move the laser beam. The control unit 149 also keeps the laser beam focused on the conveyor plane through the z-axis lens driver 161 which moves the focusing lens 151 by means of the z-axis galvanometer. As previously explained, the focusing lens is moved to maintain the proper focusing of the beam on the spot 154 as the mirror 153 moves through its cycle of oscillation. The positional relationship of the mirror 153 and the focusing lens 151 relative to cover motion is stored as a table in the ROM of the control unit 149. As the mirror 151 begins its movement at the beginning of the cut, the laser beam 139 is turned on by the control unit 149 which also controls the intensity of the beam dependent upon the speed of the conveyor as sensed by the encoder 131. The intensity of the beam is adjusted several times during the cut to precisely match the conveyor speed. At the end of the cut the laser beam 139 is turned off and, as the cover 22 continues to move through the laser cutting plane 147, the mirror 153 is returned to its starting position ready for the next cut and the cutting cycle is completed.

TUBE FORMING METHOD

Figure 22:
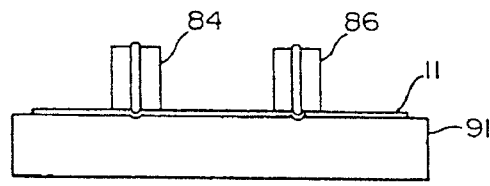
FIGS. 22–24 illustrate the method steps for the continuous formation of the novel tubular attachment member.
Figure 23:
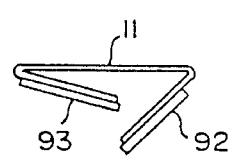
Figure 24:
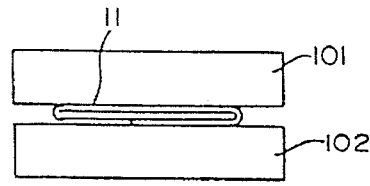
Figure 25:
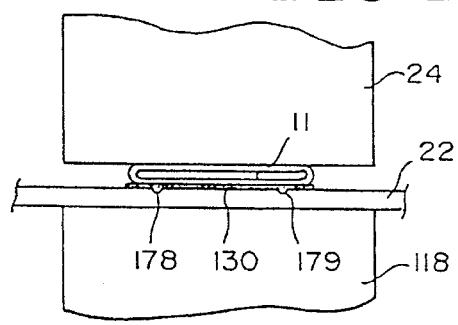
FIG. 25 illustrates the placement of the attachment member on the book covers.

FIGS. 22–25 illustrate the method steps utilized in forming the novel double-walled attachment member and applying the member to the book cover. The cover is first scored along each lateral edge by the scoring wheels 84 and 86 which cooperate with the deformable surface of the roller 91 as shown in FIG. 22. The score lines thus formed precisely locate the fold lines for the tube forming operation and determine the precise width of the tubular attaching member. As shown in FIG. 23, the lateral edges of the web 11 are folded inwardly, one upon the other, by the action of the horns 92 and 93 which converge to form the tube as the web is pulled therethrough by the pinch roll 24. It will be noted that because of the scoring operation and folding procedure, the flattened double-walled member with its overlap joint on one wall may be prepared without adhesive application to the overlap joint. This feature simplifies the system by eliminating a tube gluing station and its inherent problems. The double-walled tube is flattened by means of the forming rolls 101 and 102 as shown in FIG. 24 with the lateral edges now being creased at the score lines. The tubular member is now ready for application to the advancing covers 22. As shown in FIG. 25, the covers 22 will normally be prescored, as indicated at 178 and 179, and provided with a glue line 130 which may be extended beyond the score lines 178 and 179. It will be noted that, in some cases, it may be desirable to limit the glue line 130 within the confines of the score lines 178 and 179, depending upon the character of the book binding desired. The tubular member 11 is laid down on the book cover spine with the lap joint face down on the cover. At this point, both sides of the lap joint are adhesively bound to the surface of the cover spine and, since the web member 11 is adhesive impermeable, the opposite wall of the tube is free for its separate attachment to the book cover spine.

The present invention has been described with reference to a preferred embodiment. Modifications and alterations may become apparent to one skilled in the art upon reading and understanding this specification. It is intended to include all such modifications and alterations within the scope of the appended claims.

What is claimed is:

1. Apparatus for forming a tube comprising in combination;

a source of continuous web stock, a generally flat backing surface for supporting said web, pulling means for pulling said web across said backing surface, elongated shoe means mounted adjacent said backing surface for holding the web in moving contact with said backing surface, said shoe means including spaced lateral edges, and side edge forming members mounted on said backing surface and having forming surfaces, for contacting and folding each lateral edge portion of said web toward the other about fold lines defined by the lateral edges of said shoe means to form a longitudinal lap joint as the web is pulled therethrough.

2. The apparatus of claim 1 wherein;

said elongated shoe means includes first and second elongated shoe members each having an outside longitudinal edge defining the respective fold lines in said web, said shoe members being laterally adjustable to vary the lateral distance between said fold lines.

3. The combination of claim 2 further including;

scoring means aligned with the respective outside longitudinal edges of said shoe members for scoring each lateral edge portion of said web to facilitate the folding thereof.

4. The combination of claim 3 wherein said web comprises adhesive impermeable paper stock, and further including;

printing means for printing information on the central portion of the side of said moving web comprising the surface of one wall of said double-walled member opposite the longitudinal lap joint.

5. The combination of claim 1 further including;

means for maintaining a constant pulling tension in said web stock.

6. The combination of claim 5 further including;

forming means for compressing said double-walled member subsequent to formation thereof.

7. Apparatus for forming a tubular book binding attachment strip comprising in combination;

a source of continuous web stock, a generally flat backing surface for supporting said web, pulling means for pulling said web across said backing surface with the surface of one side of the web in contact therewith, elongated shoe means mounted adjacent said backing surface for contacting the central portion of the other side of the web for holding the web in moving contact with the backing surface, said shoe means including spaced lateral edges, and elongated folding horns mounted on said backing surface and located on each side of said shoe means in contact with the lateral edge portions of said one side of the web, each said folding horns having a curved folding surface for guiding the edge portions of the web about respective fold lines through approximately 180° rotation toward each other to form a longitudinal lap joint as the web is pulled therethrough, the lateral edges of said shoe means defining the longitudinal fold lines of the web, whereby a continuous substantially flat double-walled tubular attachment strip with a longitudinal lap joint in one wall thereof is formed by pulling said web stock.

8. The apparatus of claim 7 wherein;

said shoe means comprise first and second laterally adjustable shoe members with outside lateral edges parallel to the respective edge portions of the web for varying the distance between said fold lines to vary the width of the tubular attachment member, and said apparatus further including;

scoring means for forming score lines parallel with each longitudinal edge of said web to facilitate folding thereof, said score lines being spaced a distance equal to the distance between the outside lateral edges of said shoes.

9. The apparatus according to claim 8 wherein said web comprises adhesive impermeable paper stock, and said apparatus further including;

printing means for printing information on the central portion of said other side of the moving web prior to formation of said double-walled tubular member, whereby said printed information is located on the surface of one wall of said attachment member opposite said lap joint.

10. Apparatus according to claim 8 wherein;

one of said folding surfaces includes a down stream extended end portion in the direction of travel of said web which overlies and extends beyond the downstream end of the other said folding surfaces, said folding horns being laterally adjustable to accommodate varying widths of web stock, whereby one folded edge portion of said web is caused to overlap the other edge portion thereof to form said longitudinal lap joint.

11. The method of forming a continuous flat tubular book binding attachment strip comprising the steps of;

pulling a continuous web from a source of web stock;

forming continuous parallel score lines a predetermined distance from each longitudinal edge of the moving web, then holding the moving web against a backing surface by shoe means having lateral edges in contact with the web spaced from the lateral edges thereof along the score lines, and simultaneously guiding the edge portions of the web toward each other through an approximately 180° arc about the score lines, thereby forming fold lines with the lateral edges of said shoe means defining the fold lines and with one edge portion overlying the other in surface-to-surface contact to form a lap joint, whereby a continuous substantially flat double-walled tubular attachment strip with a longitudinal lap joint in one wall thereof is formed, each said wall having an inner and an outer surface.

12. The method according to claim 11 whereby said web is pulled under constant tension and including the step of;

printing information on the longitudinal central portion of the side of said web which constitutes the inner surface of one wall of the double-walled strip opposite the lap joint prior to forming said tubular strip, and passing said double-walled tubular strip over a forming surface to flatten said strip.

13. The method of forming a continuous flat tubular strip comprising the steps of;

pulling a continuous web from a source of web stock, then holding the moving web against a backing surface by elongated shoe means having lateral edges in contact with the web spaced from the lateral edges thereof, and simultaneously guiding the edge portions of the web toward each other through an approximately 180° arc, thereby forming fold lines with the lateral edges of said shoe means defining the fold lines and with one edge portion of the web overlying the other in surface-to-surface contact to form a lap joint.

* * * * *

UNITED STATES PATENT AND TRADEMARK OFFICE
CERTIFICATE OF CORRECTION

PATENT NO. : 5,496,253

DATED : Mar. 5, 1996

INVENTOR(S) : Donald L. Snellman; Dean G. Tonkin

It is certified that error appears in the above-identified patent and that said Letters Patent is hereby corrected as shown below:

```
Col. 2, line 29, change "respectfully"
to --respectively--

Col. 4, line 36, insert --2-- after "Fig",
second occurance.
```

Signed and Sealed this

Third Day of September, 1996

Attest:

BRUCE LEHMAN

*Attesting Officer*  *Commissioner of Patents and Trademarks*